(12) United States Patent
Asa

(10) Patent No.: US 7,905,395 B2
(45) Date of Patent: Mar. 15, 2011

(54) COMMUNICATION SYSTEM, COMMUNICATION TERMINAL AND COMMUNICATION METHOD

(75) Inventor: Kenji Asa, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 102 days.

(21) Appl. No.: 11/873,900

(22) Filed: Oct. 17, 2007

(65) Prior Publication Data

US 2008/0128483 A1 Jun. 5, 2008

(30) Foreign Application Priority Data

Nov. 30, 2006 (JP) .................. 2006-324572

(51) Int. Cl.
*G07D 11/00* (2006.01)
*G06K 7/01* (2006.01)
(52) U.S. Cl. ..................... 235/379; 235/382.5
(58) Field of Classification Search .................. 235/379, 235/382.5, 383; 705/23, 24, 26, 27, 29, 41, 705/50
See application file for complete search history.

(56) References Cited

U.S. PATENT DOCUMENTS

| | | | |
|---|---|---|---|
| 6,577,861 B2* | 6/2003 | Ogasawara | 455/419 |
| 7,003,495 B1* | 2/2006 | Burger et al. | 705/50 |
| 2002/0059266 A1* | 5/2002 | I'anson et al. | 707/100 |
| 2002/0143769 A1 | 10/2002 | Tecu et al. | |
| 2003/0187755 A1* | 10/2003 | Acharya et al. | 705/27 |
| 2005/0040230 A1* | 2/2005 | Swartz et al. | 235/383 |
| 2005/0288036 A1* | 12/2005 | Brewer et al. | 455/456.2 |

FOREIGN PATENT DOCUMENTS

| | | |
|---|---|---|
| AQ | 2 363 035 A | 12/2001 |
| JP | 2003-281437 | 10/2003 |
| JP | 3107749 | 1/2005 |
| JP | 2006-24060 | 1/2006 |
| JP | 2006-172514 | 6/2006 |
| WO | WO 97/45814 | 12/1997 |
| WO | WO 2006/120802 A1 | 11/2006 |

* cited by examiner

*Primary Examiner* — Thien M Le
(74) *Attorney, Agent, or Firm* — Oblon, Spivak, McClelland, Maier & Neustadt, L.L.P.

(57) ABSTRACT

A communication system includes a communication terminal wirelessly communicating with a predetermined base station and a server capable of transferring data through the wireless communication with the communication terminal. The communication terminal includes a payment settlement processing unit capable of carrying out payment settlement processing, a record memory unit configured to store a record of the payment settlement processing carried out at the payment settlement processing unit, a display unit configured to display record data stored in the record memory unit, and a control unit configured to transfer the record stored in the record memory unit to the server. The server includes a storage unit configured to store the record data transferred from the communication terminal, and a record disclosure processing unit configured to transfer the record data stored in the storage unit to other communication terminals within a predetermined range.

14 Claims, 10 Drawing Sheets

FIG. 3A

| Merchandise Information 1 | |
|---|---|
| Category | Fashion |
| Shop | ***Shibuya |
| Memo | △△-Style Clothes |
| Purchase Information | T-Shirt | ¥5,040 | Picture Data |

FIG. 3B

| Merchandise Information 2 | |
|---|---|
| Category | Dining |
| Shop | ※※※Kounanguchi |
| Memo | ★★Recommended |
| Purchase Information | Negi-Ramen | ¥800 | Picture Data |

FIG. 4A

| Merchandise Information 1-1 | |
|---|---|
| Information ID | 12345678 |
| Category | Fashion |
| Shop | ***Shibuya ■■■ |
| Position Information (GPS) | |
| Memo | △△-Style Clothes Available |
| Purchase Information | T-Shirt | ¥5,040 | Picture Data | 2006/07/05 | Comment | Purchaser's Information |

FIG. 4B

| Merchandise Information 2-1 | |
|---|---|
| Information ID | 87654321 |
| Category | Dining |
| Shop | ※※※Kounanguchi |
| Position Information (GPS) | □□□□ |
| Memo | Negi-Ramen Good |
| Purchase Information | Ramen | ¥800 | Picture Data | 2005/12/31 | Comment | Purchaser's Information |

FIG. 5A

Merchandise Information 1-2

| Information ID | 12345678 | | | | | |
|---|---|---|---|---|---|---|
| Category | Fashion | | | | | |
| Shop | ***Shibuya | | | | | |
| Position Information (GPS) | ■■■■ | | | | | |
| Memo | △△-Style Clothes Available | | | | | |
| Purchase Information | T-Shirt | ¥5,040 | Picture Data | 2006/07/05 | Comment | Purchaser's Information | Disclosure Range Information |

FIG. 5B

Merchandise Information 2-2

| Information ID | 87654321 | | | | | |
|---|---|---|---|---|---|---|
| Category | Dining | | | | | |
| Shop | ※※※Kounanguchi | | | | | |
| Position Information (GPS) | □□□□ | | | | | |
| Memo | Negi-Ramen Good | | | | | |
| Purchase Information | Ramen | ¥800 | Picture Data | 2005/12/31 | Comment | Purchaser's Information | Disclosure Range Information |

| Identity Verification Result | Personal ID | GPS | Information Acquisition Range | Group ID1 | Group ID2 | ... |
|---|---|---|---|---|---|---|

*FIG. 9*

| Information 1 | Information 2 | Information 3 | ... |
|---|---|---|---|

COMMUNICATION SYSTEM, COMMUNICATION TERMINAL AND COMMUNICATION METHOD

CROSS REFERENCES TO RELATED APPLICATIONS

The present invention contains subject matter related to Japanese Patent Application JP 2006-324572 filed in the Japanese Patent Office on Nov. 30, 2006, the entire contents of which being incorporated herein by reference.

BACKGROUND OF THE INVENTION

1. Field of the Invention

The present invention relates to a communication system suitable for application to a system in which a communication terminal such as a mobile phone unit is used and to a communication terminal that is used for such system as well as a communication method that is applied to such system.

2. Description of the Related Art

Mobile phone units including such function as a noncontact IC card, FRID (Radio Frequency Identification) and the like and capable of short-range (close) wireless communication with a reader/writer in proximity thereto, for example, about several centimeters without contact have been commercially available. With such short-range wireless communication function, mobile phone units can be used as a ticket for public transportation, electronic money, credit card, personal authentication card and the like.

For example, if a mobile phone unit having the electronic money function is used and a user deposits a certain amount of money into the unit beforehand, the user can pay for merchandise purchased and the like within the deposited amount of money in a shop where a reader/writer for the relevant electronic money function is provided. If the mobile phone unit has the credit card function, the user can pay for the purchased merchandise similarly and the paid amount of money will be later withdrawn from a bank account.

Japanese Registered Utility Model No. 3107749 discloses an example of an electronic card for personal authentication, which can be used as the electronic money and credit card.

Japanese Unexamined Patent Application Publication No. 2006-172514 discloses an example of a system in which a mobile terminal communicates with an information center, sends information on a position of the terminal to the center, and obtains map information from the information center based on that position.

SUMMARY OF THE INVENTION

In a payment settlement using a typical credit card, information on a name of shop, a price of meal or merchandise, and the like can be obtained from a list of credit payment settlement in a bill and a payment record display service on the Internet. However, details such as a location of the shop, what was purchased, and where the shop is may not be available in such statement and display service. Therefore, the record of credit payment settlement may not be useful in the case where the user wants to visit the same shop again, for example.

Information on goods sold in a shop, a menu of meals offered at a restaurant, and the like are usually obtained at a website on the Internet showing a guide to the shop or restaurant, for example. Various kinds of information terminal that display a map of a specific area prepared at a website introducing, for example, shops and restaurants have been commercially available. The user selects the position of a registered shop or restaurant indicated in the map using such terminal and then details of the selected shop or restaurant are displayed on the terminal. In this case, information may be automatically sent based on the position of the mobile terminal by applying processing described in Japanese Unexamined Patent Application Publication No. 2006-172514, for example. In this system, a communication center is notified of the position of the mobile terminal at present when displaying the map, for example, and in response the center transfers information on the map showing the neighborhood of the present position of the terminal and information on shops to the mobile terminal. However, information provided using such a system is limited to the information on the shops and restaurants registered in the center beforehand and so the information may not be reliable because provided information on the shops and restaurants may be old or in general only favorable information is provided. Moreover, information necessary for each user is not always in order in such a system.

If a shop or place once visited is quite favorable and a note thereof is written in a notepad of a mobile phone unit or the like, it may be inconvenient for the user when the user wishes to recommend such shop or place to friends, since literal information alone is provided. Even if a picture of the shop has been taken using a camera incorporated in the mobile phone unit, such information may be insufficient since image information alone is provided this time.

Further, in the case where information on shops and the like collected by each user is uploaded and shared using service provided on the network, information may not be reliable since the writer of the information is anonymous, and also volume of information may be huge.

It is desirable to provide a system in which information based on a payment settlement record can be provided in the case of using a payment settlement function incorporated in a communication terminal such as a mobile phone unit.

According to an embodiment of the present invention, there is provided a communication system including a communication terminal that performs wireless communication with a predetermined base station and a server capable of transferring data by the wireless communication with the communication terminal.

The communication terminal includes a payment settlement processing unit configured to carry out payment settlement processing. In the case where the payment settlement processing is carried out at the payment settlement processing unit, the communication terminal stores a record of the payment settlement processing and transfers the stored record to the server.

The record transferred to the server is stored in the server, and the stored record data can be transferred to other communication terminals within a predetermined range.

Thus, the record of payment settlement processing using a short-range wireless communication processing unit provided in the communication terminal can be stored as data arranged in a desirable form. Since the record is collected in the server and afterward can be transferred to other communication terminals within a predetermined range, the record related to the payment settlement for shopping, dining, and the like can be shared within a predetermined group, for example.

According to the embodiment of the present invention, the record of the payment settlement including added data such as a comment can be stored in the communication terminal in the case where the payment settlement for shopping, dining, and the like are carried out using the payment settlement function that is provided in the communication terminal.

Therefore, the user having such communication terminal can keep the record including the added comment on the shop and restaurant where the user has bought goods and dined in the past, or on the merchandise purchased at the shop and the menu of food dined in the restaurant so that the payment settlement record can efficiently be used.

Further, since data on the record is transferred to the server from which such data can be transferred to another communication terminal within a predetermined range, information on the shop and merchandise related to the payment settlement can be shared within the predetermined range. Accordingly, it is possible for the user to recommend the merchandise purchased at the specific shop to friends, for example.

DESCRIPTION OF THE PREFERRED EMBODIMENTS

Hereinafter, an embodiment of the present invention is explained with reference to the accompanied drawings.

This embodiment is applied to a wireless telephone system in which a mobile phone unit is used as a communication terminal. The mobile phone unit is connected with the wireless telephone system through the wireless communication with a predetermined base station and sends and receives voice and data. The mobile phone unit applied to this embodiment includes a noncontact IC card unit incorporated in or connected with the mobile phone unit so that the communication is performed with a reader/writer provided in a shop using the noncontact IC card unit to carry out payment settlement processing. Further, according to the embodiment, a server for storing the information related to the payment settlement is prepared in the wireless telephone system (or, in a company operating the system) and the mobile phone unit can access the server. The server may be accessed through the Internet, for example. It should be noted that the short-range (close) wireless communication processing unit for performing the communication with the reader/writer is termed the noncontact IC card unit in the following explanation, but the name is given in view of the function and the processing unit is not necessarily made into the shape of an IC card.

First, an example of configuration of the mobile phone unit is explained with reference to FIG. 1.

Figure 1:
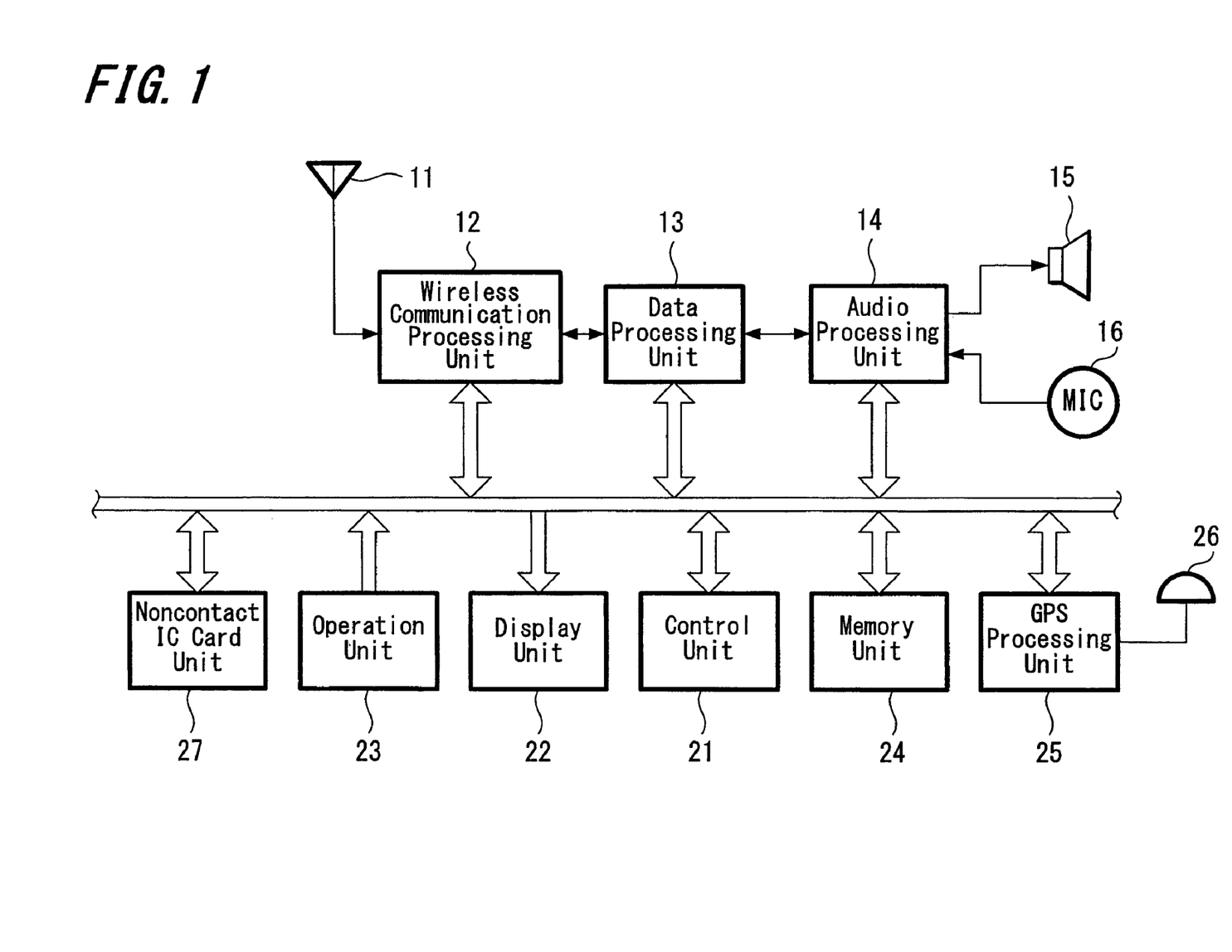
FIG. 1 is a block diagram showing an example of a terminal according to an embodiment of the present invention.

As shown in FIG. 1, the mobile phone unit includes an antenna 11, a wireless communication processing unit 12, a data processing unit 13, an audio processing unit 14, a speaker 15, and a microphone 16. The wireless communication processing unit 12 connected to the antenna 11 is configured to perform wireless transmission and reception with the base station and the like. A signal received by the antenna 11 is sent to the data processing unit 13 in which processing of retrieving necessary data is performed. When audio data is received, the received audio data is supplied to the audio processing unit 14 in which audio data processing is performed, and the processed audio signal is output from the speaker 15. An audio signal picked up by the microphone 16 is supplied to the audio processing unit 14 in which the supplied audio signal is processed into transmission audio data, and the processed audio data is sent to the data processing unit 13 to be the audio data processed for transmission. The transmission data prepared in the data processing unit 13 is processed in the wireless communication processing unit 12, and the processed data is wirelessly transmitted from the antenna 11.

Further, the mobile phone unit includes a control unit 21, a display unit 22, an operation unit 23, a memory 24, a GPS processing unit 25, a GPS antenna 26 and a noncontact IC card unit 27. When data is sent and received by the mobile phone unit, that is, when accessing the Internet or sending and receiving electronic mail data, the data received in the data processing unit 13 is sent to the control unit 21 and stored in the memory 24 and the transmission data is sent to the data processing unit 13 from the memory 24 to be processed for transmission. The display unit 22 is configured to display data corresponding to mail data and data for a browser stored in the memory 24. The memory 24 is also used when storing information related to the later-described payment settlement processing. In addition, the operation unit 23 includes an operation key and the like for the user to operate. The control unit 21 is configured to determine an operation state to set the operation state and mode corresponding to the user's operation.

Further, the GPS (Global Positioning System) processing unit 25 of the mobile phone unit according to this embodiment is configured to measure the present position of the mobile phone unit based on a signal received from a positioning satellite by a GPS antenna 26. The measured position information is determined at the control unit 21.

Moreover, the noncontact IC card unit 27 of the mobile phone unit according to this embodiment is configured to carry out personal authentication, payment settlement processing and the like by performing the wireless communication for authentication with a reader/writer in proximity to the mobile phone unit. The control unit 21 is configured to monitor a processing state of the noncontact IC card unit 27 so that the authentication state and the like can be displayed.

Next, an example of the processing performed by the mobile phone unit according to this embodiment is explained with reference to FIG. 2 and subsequent figures.

First, an outline of the processing according to this embodiment will be explained below. The communication system according to this embodiment is applied to the case where the payment settlement processing such as the payment for the purchased merchandise and dining expense is carried out using the function of the noncontact IC card unit that is provided in the mobile phone unit. According to the system, the data related to the payment settlement processing is stored in the mobile phone unit and further the data is transferred to the server if necessary so that the user can obtain useful information at the time of purchase.

When purchasing the merchandise, the user inputs the information related to the purchased merchandise with information such as the position information of the place at the time of purchase and stores such information in the mobile phone unit. The user can view the stored information using the mobile phone unit in which the information related to the purchased merchandise is overlapped with the map showing a place around the present position of the user. Further, the information stored in the mobile phone unit is uploaded to the server and the like so that the information can be shared with friends and a third party.

According to the embodiment, information related to the payment settlement processing such as the payment using the credit card can be obtained in more details and it is possible to purchase merchandise related to the merchandise purchased in the past and to search for the information on the shop visited in the past. Further, since the information may be shared with friends and third parties, it is convenient to obtain such information as evaluation for the shop or goods through a kind of word-of-mouth communication and ranking of hot-selling merchandise when searching the merchandise and shop unfamiliar to the user. In addition, the information is used not only for purchasing the merchandise and the like but also for obtaining information for a tourist to visit a site for the first time and used as a memo for storing the details of once visited shop and place so that the user may keep the information.

A specific example of the processing is explained below. As shown in FIG. 2, a management server and a data server are provided for the system in which a mobile phone unit is used. The management server manages credit information on the owner of the mobile phone unit so that a financial status inquiry is conducted. A reader/writer is a device that is set up in shops and works between the mobile phone unit and the management server to handle the information on the merchandise and the like. The data server is a server in which data to be shared with others is stored. In addition, a large number of groups such as a group organized among friends and a community group with gathering people having the same taste are registered in the data server. Those groups have unique group names and group IDs, respectively. Also, the user of the system is registered in advance before using the system so that an unique ID is assigned individually. An information ID is also assigned to each information.

First, the processing on the payment settlement using the mobile phone unit is explained with reference to FIG. 2. When paying for goods or the like using the mobile phone unit, the mobile phone unit is brought in proximity to the reader/writer provided in the shop so as to send data of purchase request to the reader/writer (step S11). At this time, the reader/writer is connected with the management server to send the data (step S12), where the financial status inquiry is conducted through the identity verification to determine whether the purchase is authorized and the result thereof is sent back to the reader/writer (step S13). In the case where the result of the purchase authorized is sent back, the mobile phone unit is notified of the payment settlement (step S14). The payment settlement from a deposited amount in the IC card or payment settlement through the credit function may be made as this payment settlement.

When the data authorizing the payment settlement is sent to the mobile phone unit at step S14, at least the information on the amount of payment settlement and the shop where the payment is settled, is sent to the mobile phone unit. Here, in the case where the information related to the purchased merchandise is in the reader/writer of the shop, the mobile phone unit also receives such merchandise information. The information received by the mobile phone unit is recorded (stored) in the memory provided in the mobile phone unit (step S15).

When recording the above-described information, the information such as the position data of the mobile phone unit, which is measured by the GPS positioning unit, with the date of the payment settlement and the comment (memo) input by the purchaser (user) is added and stored in the mobile phone unit. In the case where the mobile phone unit has a built-in camera function, a picture of the merchandise and shop photographed by the camera may be stored.

Subsequently, whether the purchase information is sent to the data server for sharing the information is determined by the user operating the mobile phone unit (step S16). Here, if it is determined to send the information to the server to be stored, the user determines person(s) to which the information is disclosed, adds information for determining a disclosure range and sends the recorded data to the data server (step S17). The data server stores the data received from the mobile phone unit, and then a purchase-and-store sequence shown in FIG. 2 ends (step S18).

Figure 2:
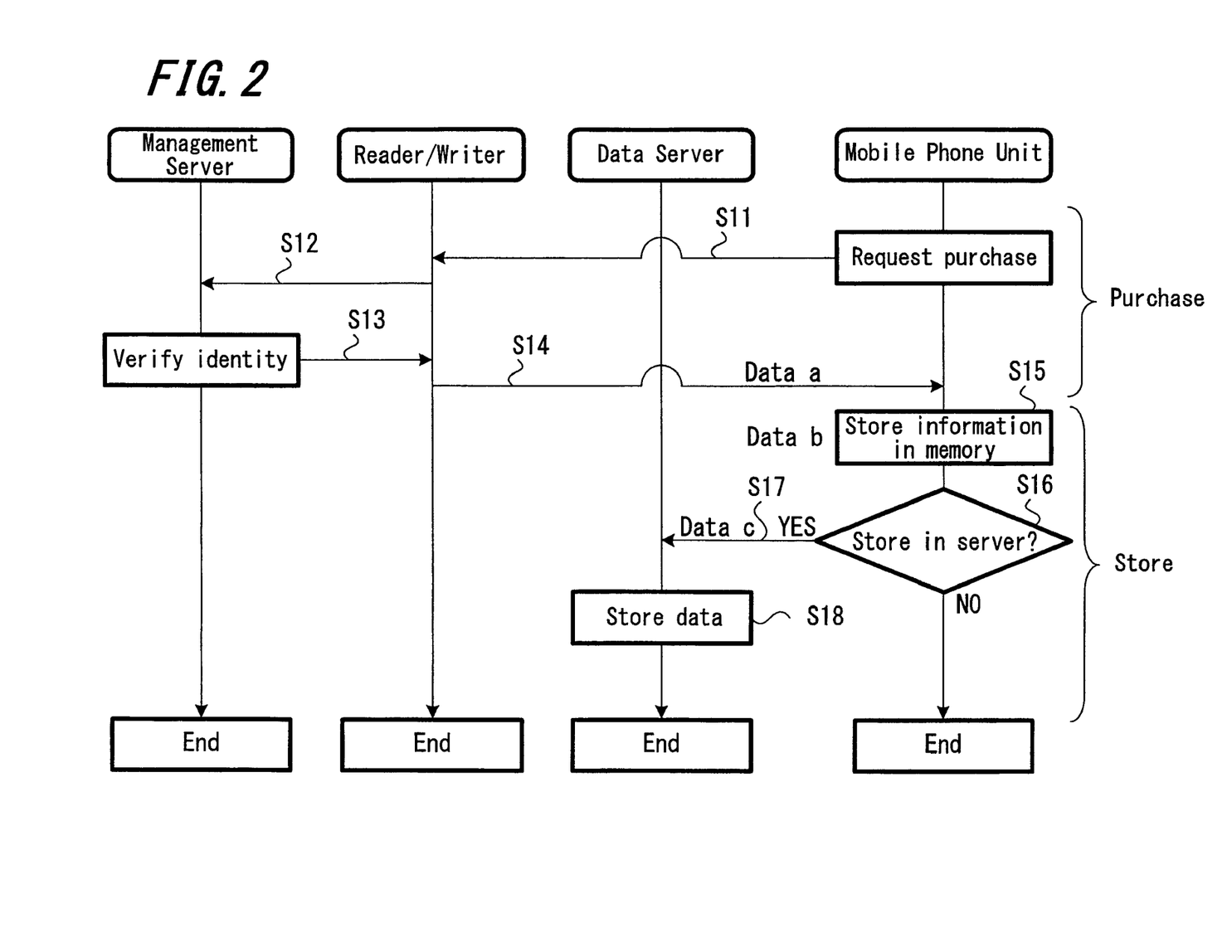
FIG. 2 is a sequence chart showing an example of "purchase and store processing" according to an embodiment of the present invention.
Figure 3A:
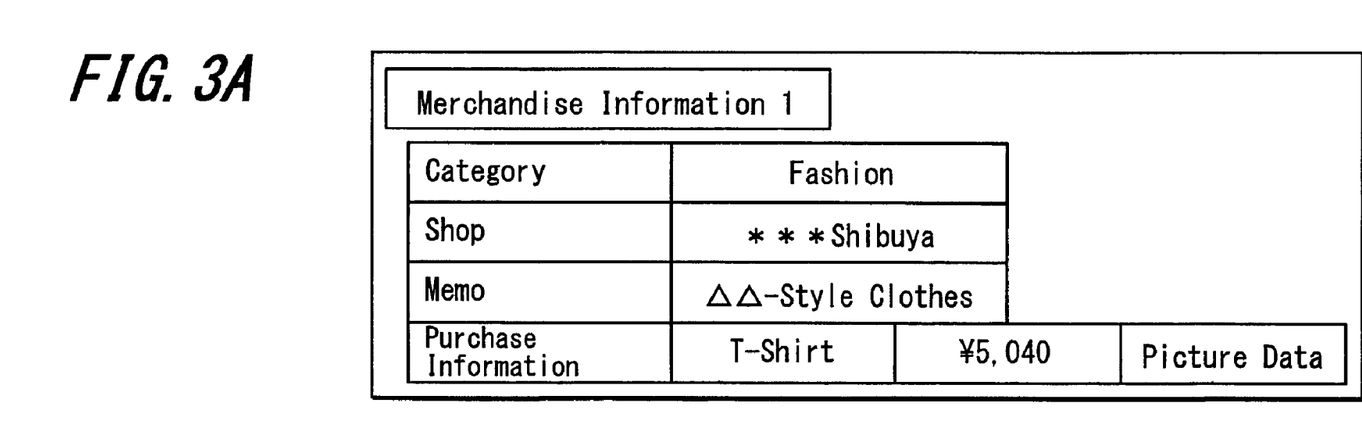
FIGS. 3A and 3B are explanatory diagrams showing examples of merchandise information according to an embodiment of the present invention.
Figure 3B:
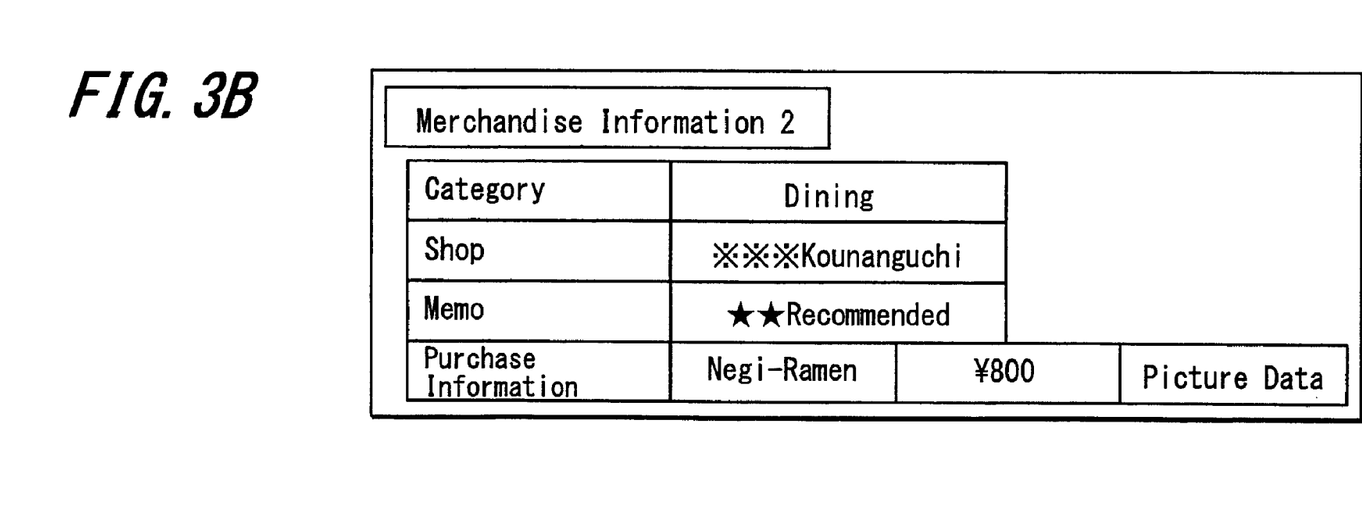

FIGS. 3A and 3B are diagrams showing examples of the information a on the merchandise and shop, for which the payment settlement is made, transmitted from the reader/writer to the mobile phone unit (transmitted at step S14 of FIG. 2). FIGS. 3A and 3B are diagrams respectively showing separate examples.

FIG. 3A is the example showing information in the case of purchasing a T-shirt. In this example, the information includes an attribute of merchandise (or shop), a name of shop where the merchandise is purchased, a memo (comment) prepared by the shop, the information on the purchased merchandise for which the payment settlement is made, an amount of money, and image data of the merchandise.

FIG. 3B is an example showing information in the case of dining in a restaurant. In this example, the information includes an attribute of merchandise (or restaurant), a name of restaurant, a memo (comment) prepared by the restaurant, information on a menu of food for which the payment settlement is made, an amount of money, and image data of merchandise (food and drink).

It should be noted that only a part of information shown in FIGS. 3A and 3B may be transmitted from the reader/writer.

Figure 4A:
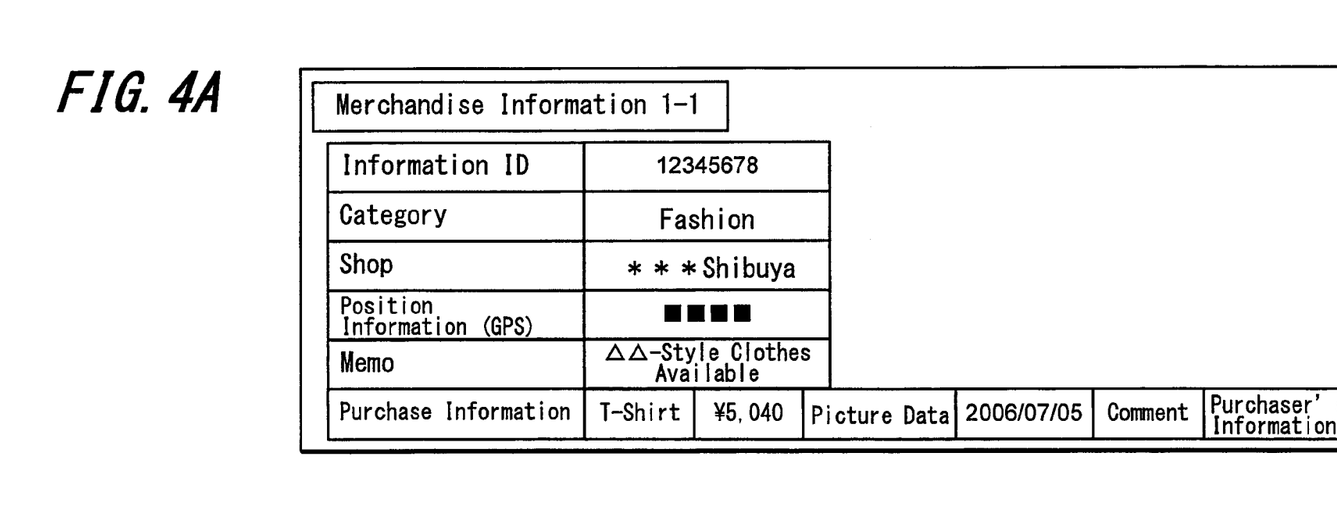
FIGS. 4A and 4B are explanatory diagrams showing examples of data stored in a terminal according to an embodiment of the present invention.
Figure 4B:
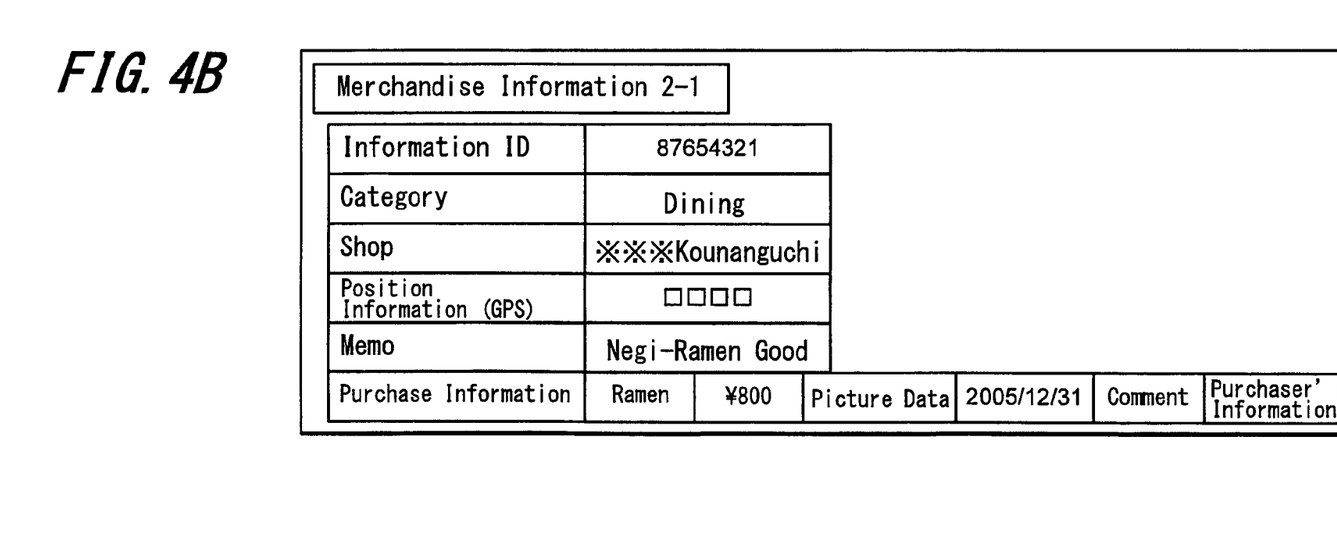

Such data transmitted from the reader/writer to the mobile phone unit is stored in the memory 24 provided in the mobile phone unit. Although the data may be unchanged when storing the data, the transmitted data may be stored as the data to which data input by the user is added. FIGS. 4A and 4B are diagrams showing examples of the information b (stored at step S15 in FIG. 2) which is stored in the memory provided in the mobile phone unit. FIGS. 4A and 4B respectively show separate examples. As shown in FIGS. 4A and 4B, information ID is added to each information and stored. In this case, an information ID list is prepared and retained in the mobile phone unit, for example.

FIGS. 4A and 4B show the examples in the case of storing each of the purchase information shown in FIGS. 3A and 3B. In those examples, each purchase information is stored after the position information showing the location of the shop, for which the payment settlement is made, is obtained from the GPS processing unit 25. In addition, the information such as the date of purchase and comment input by the user (purchaser) is also added thereto.

It should be noted that if the information transmitted from the reader/writer is only a part of information shown in FIG. 3, the remaining portion of the information may be input by the user's operation.

Figure 5A:
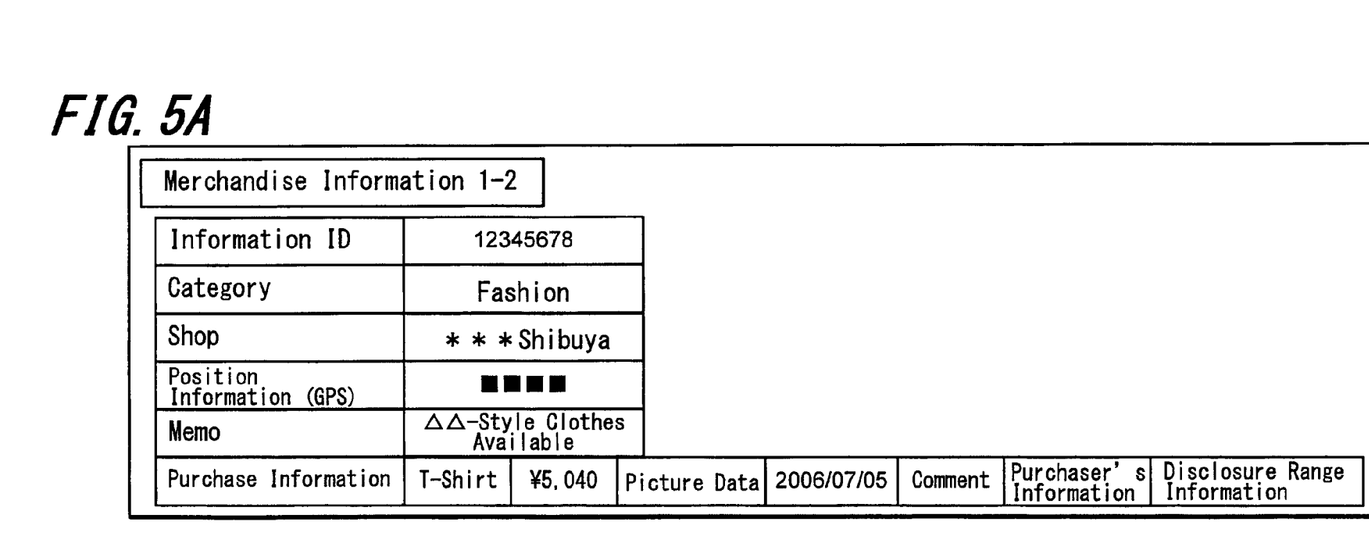
FIGS. 5A and 5B are explanatory diagrams showing examples of data stored in a data server according to an embodiment of the present invention.
Figure 5B:
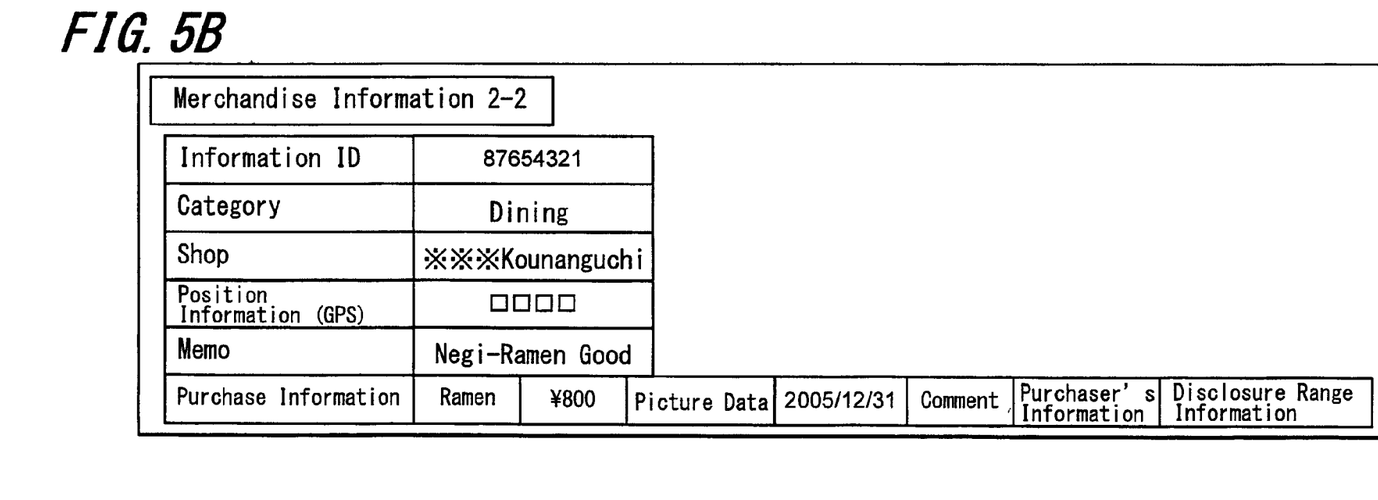

When the information thus stored in the mobile phone unit is transferred to the server, information indicating the disclosure range of the above-described information is added thereto. Information c (transferred at step S17 of FIG. 2) shown in FIGS. 5A and 5B is an example showing the information transferred to the server. FIGS. 5A and 5B are diagrams respectively showing the examples for FIGS. 4A and 4B. As shown in FIGS. 5A and 5B, the information indicating the disclosure range is added to the information stored in the mobile phone unit, which is then transmitted and stored in the server. The disclosure range is indicated by the information so that information is disclosed only to the user's mobile phone unit, disclosed only within a predetermined specific group (such as a group of friends, group of family members, and group of members joining a specific circle), or allowed to be disclosed to an unspecified third party, for example. Further, only a part of the whole purchase information may be disclosed to a third party. The case of the disclosure range being limited only to the user's mobile phone unit indicates that the information is transferred from the server only to the mobile phone unit originally transferred the information. The disclosure range of the information being limited within the specific group indicates that the information is transferred from the server only to the mobile phone units owned by the members of the specific group. The information allowed to be disclosed to an unspecified third party indicates that information is transferred to any mobile phone unit from the server.

It should be noted that a user comment and the like may be newly added when transferring the above-described information to the server. In addition, an unchanged information ID may be used when transferring the information to the server, or the new ID is assigned thereto and a list of the newly assigned ID is retained in the mobile phone unit. The ID list is retained as described above so that the information may be updated and deleted after being stored in the server.

Figure 6A:
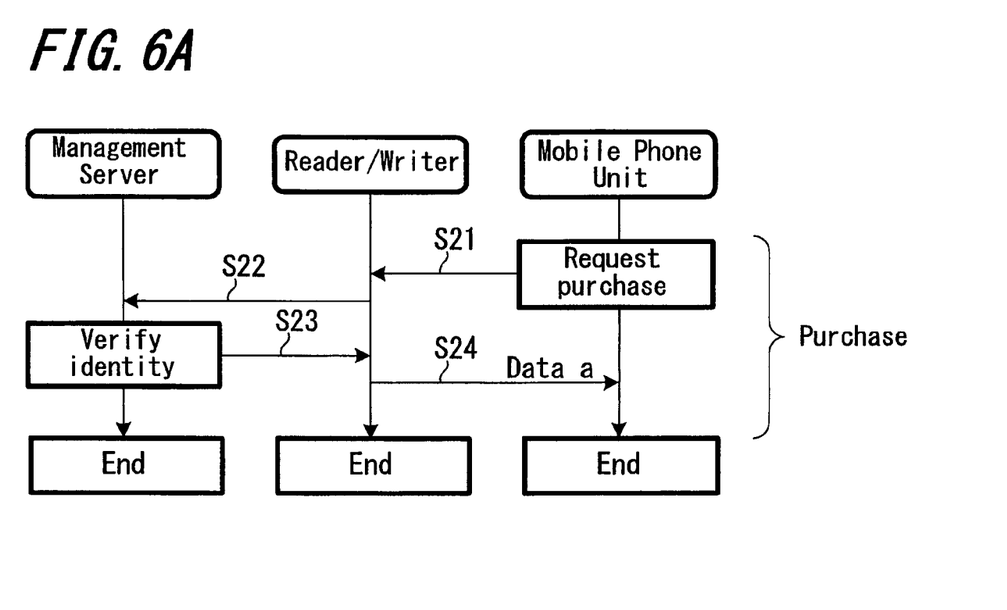
FIGS. 6A and 6B are sequence charts showing examples of "purchase and store processing" according to another embodiment of the present invention.
Figure 6B:
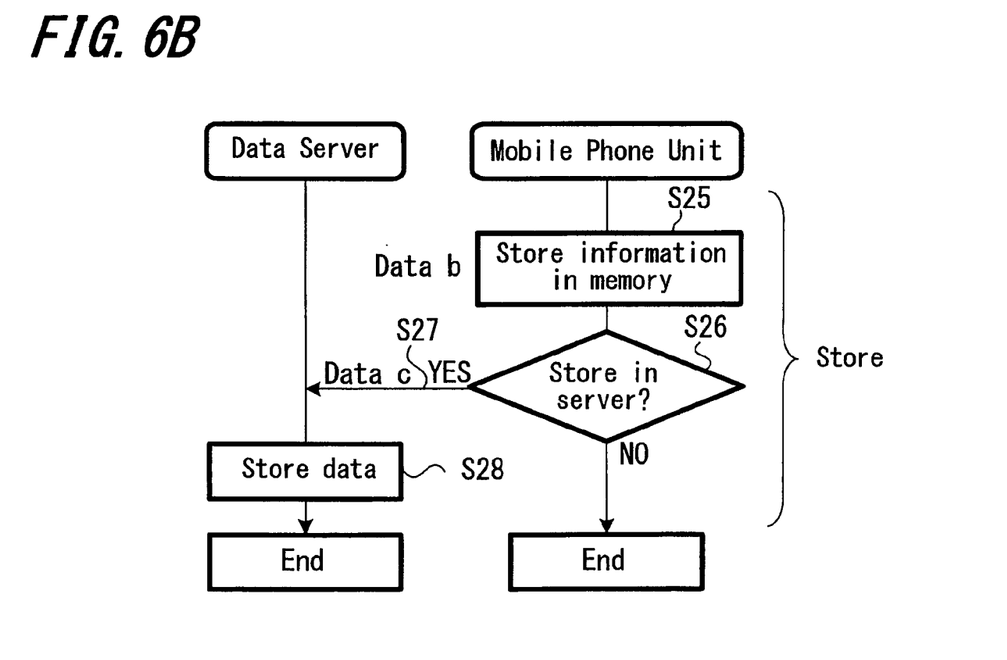

It should be noted that the purchase operation and the storage in the server are shown as a series of processing in the process sequence chart of FIG. 2, however, as shown in FIG. 6A, the operation when purchasing and, as shown in FIG. 6B, the processing of storing the information obtained at the purchase may be performed separately.

More specifically, as shown in FIG. 6A, when the payment settlement is made using the mobile phone unit, the mobile phone unit is first brought in proximity to the reader/writer that is provided in the shop so that the data of purchase request is sent to the reader/writer (step S21). At this time, the reader/writer is connected with the management server to send the data (step S22) so that the financial status inquiry for identity verification is conducted and it is determined whether the purchase is authorized, and the result thereof is sent back to the reader/writer (step S23). In the case where the result of the purchase authorization is sent back, the mobile phone unit is notified of completing the payment settlement (step S24) At this time, the data a shown in FIG. 3 is transmitted, for example. The payment settlement processing is completed at this point.

Next, the storing processing is explained with reference to FIG. 6B. At optional timing after the payment settlement, the user records (stores) the transmitted data in the memory provided in the mobile phone unit (step S25). At this time, the data b shown in FIG. 4 is stored, for example. Subsequently, it is determined through the user's operation on the mobile phone unit whether the purchase information is transmitted to the data server for sharing the information (step S26). Here, in the case where it is determined to transmit the purchase information to be stored in the server, the purchaser determines person(s) to which the information is disclosed, so that the information indicating the disclosing range is added thereto, and the stored data is transmitted to the data server (step S27). At this time, the data c shown in FIG. 5 is sent, for example. The data server stores the data that is received from the mobile phone unit, and then the purchase-and-store sequence in FIG. 6B ends (step S28).

Next, processing of obtaining the data stored in the mobile phone unit and the data stored in the server is explained.

Figure 7:
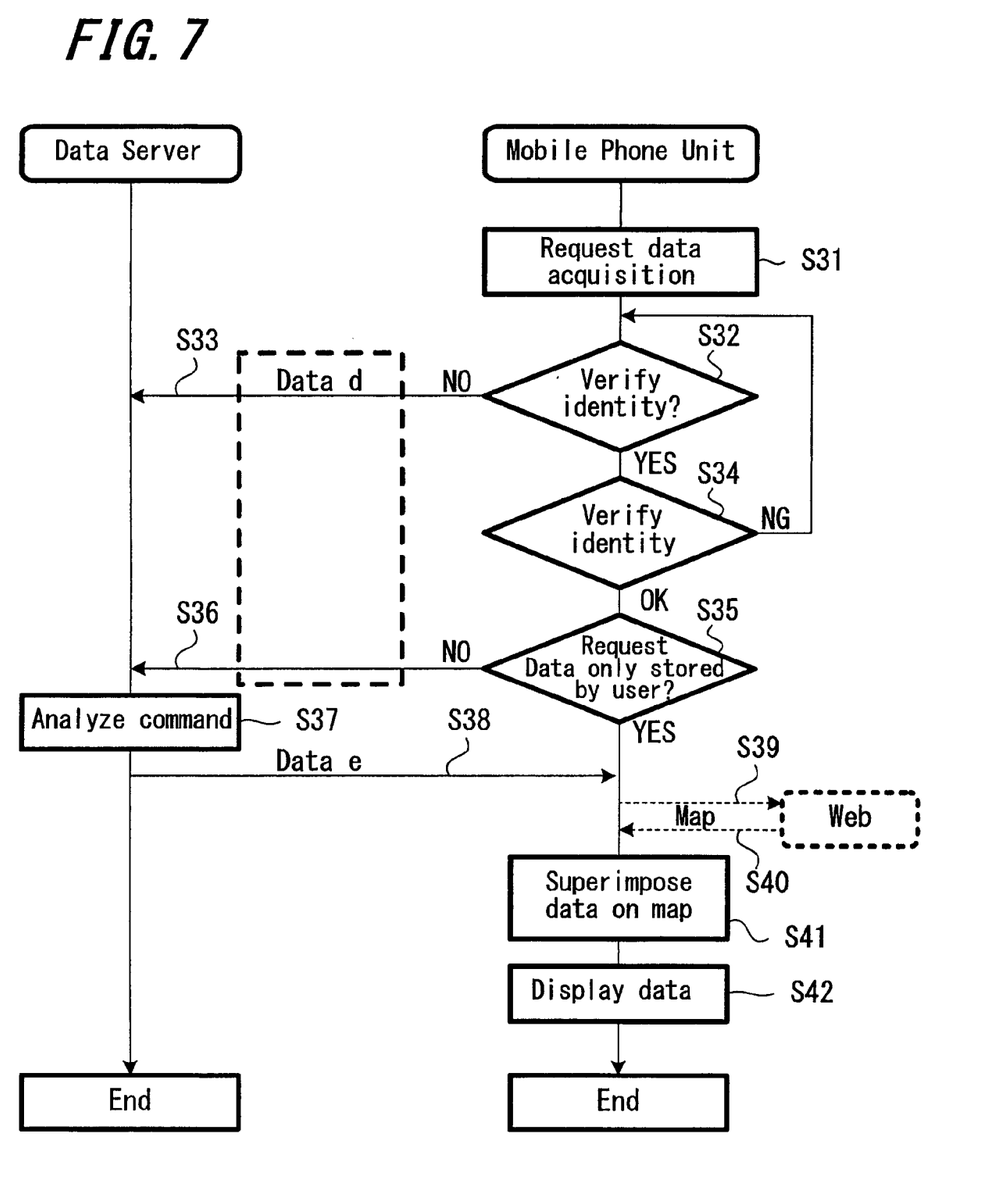
FIG. 7 is a sequence chart showing an example of data acquisition processing according to another embodiment of the present invention.

FIG. 7 is a sequence chart showing an example of processing of obtaining the data. When obtaining the information using the mobile phone unit (step S31), it is first determined whether the identity verification is conducted through the mobile phone unit (step S32). An input of a personal identification number, a biometric recognition and the like may be used for identity verification. In the case where the identity verification is requested, it is determined whether the identity verification is successful (step S34), and the process returns to step S32 in the case where the identity verification is not successful.

In the case where the identity verification is not required at step S32, necessary data d (shown in FIG. 8) is transmitted to the data server (step S33). In the case where the identity verification is successful at step S34 (more specifically, in the case where the personal identification number or the like is correctly input), it is determined whether the request is to obtain data stored only by the user (step S35). In the case where more data than stored by the user is requested, the data d (shown in FIG. 8) is transmitted to the data server (step S36). In this case, a desired area (500 m², for example) of data is specified, for example.

Figure 8:
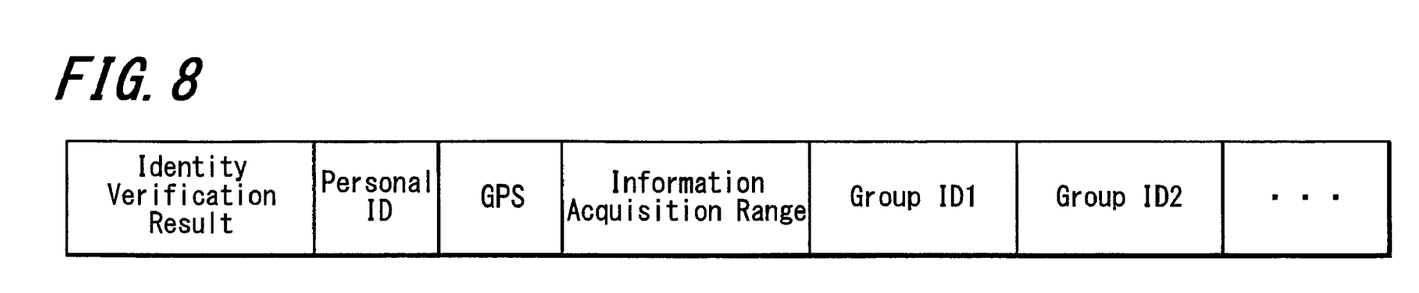
FIG. 8 is an explanatory diagram showing an example of data configuration for an information acquisition request sent from a mobile phone unit to a data server.

Here, FIG. 8 shows an example of the configuration of data d transmitted to the server in which the data d includes the result of identity verification, the personal ID, the information on the present position obtained by GPS, the information acquisition range, and ID of the group in which the user joins, and the like.

Figure 9:
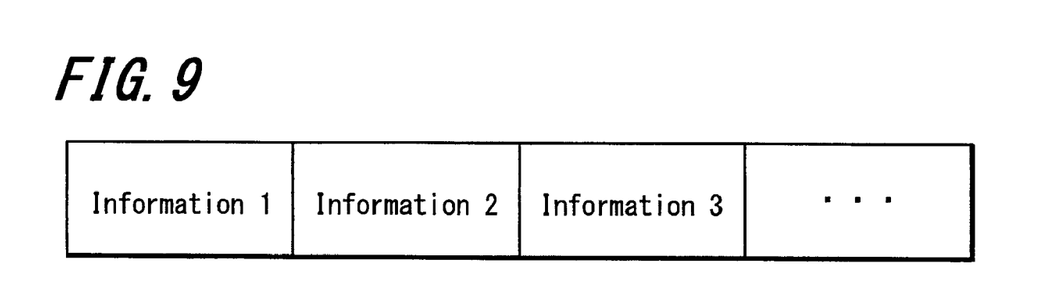
FIG. 9 is an explanatory diagram showing an example of data configuration sent back from the data server to the mobile phone unit.

In the data server, a command analysis of the transmitted data d is carried out (step S38), and data e (FIG. 9) including information retrieved from the information stored in the server within a range specified by the analysis is sent back to the mobile phone unit (step S38). As shown in FIG. 9, for example, the retrieved information is sequentially transmitted. Each unit of information is information stored as shown in FIG. 5. However, in the case where the disclosure range of the information is limited, only the information allowed to disclose is transmitted.

Returning to the explanation of FIG. 7, the mobile phone unit having received the information from the server sends a request for map data to a predetermined website (step S39) and receives the map data based on the request (step S40). It should be noted that the data server may serve as the website for obtaining the map data so that the map data can be transmitted with the transmission of the data e.

Further, display data is prepared in the mobile phone unit. The display data includes the information on the shop with the purchase record transmitted from the server, which is superimposed on the map displayed based on the obtained map data (step S41). Then, the map based on the data and the like are displayed on the display unit 22 (FIG. 1) of the mobile phone unit (step S42). Here, in the case where it is determined at step S35 that there may need only data stored in the mobile phone unit by the user, the memory provided in the mobile phone unit is referred to carry out the processing without sending the data server the request for obtaining the information. When the stored data is thus read from the memory provided in the mobile phone unit, the position of the mobile phone unit at present is obtained from the GPS information, for example. Then, the information stored in the mobile phone unit is superimposed on the map information of the desired area (500 m², for example) around the present position to be displayed.

FIGS. 10 through 13 are diagrams showing examples in the case of displaying the map on the mobile phone unit.

Figure 10:
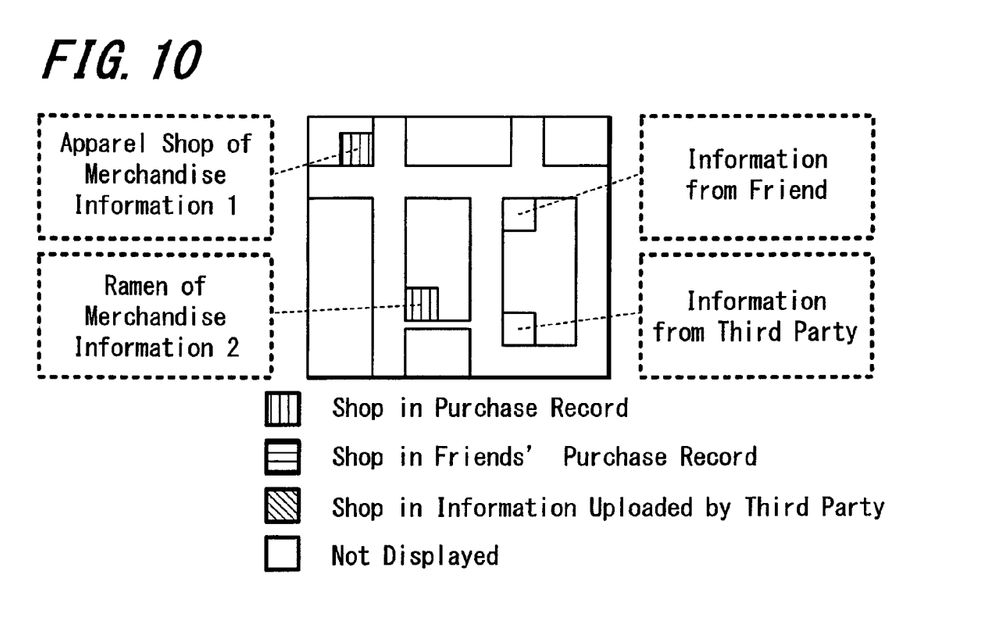
FIG. 10 is an explanatory diagram showing an example of map display according to an embodiment of the present invention

FIG. 10 shows the example in which the map is displayed based on the payment settlement information that is stored in a certain mobile phone unit. In the case where two shops with the payment settlement records indicated as merchandise information 1 shown in FIG. 4A and merchandise information 2 shown in FIG. 4B, for example, are shown on the displayed map, those two shops are displayed using a specific sign or the like. In the case where a user's operation of selecting the position of the shop related to the merchandise information 1 or 2 is performed while viewing such map display, the detailed information related to the merchandise, food, or service purchased or dined in the relevant shop is read from the memory provided in the mobile phone unit and displayed. In the display state of FIG. 10, the shop with the purchase record of the friend and the shop with the purchase record of a third party in the range of the displayed map, which are stored in the server are prevented from being displayed and are not displayed as the shops with the available information.

Figure 11:
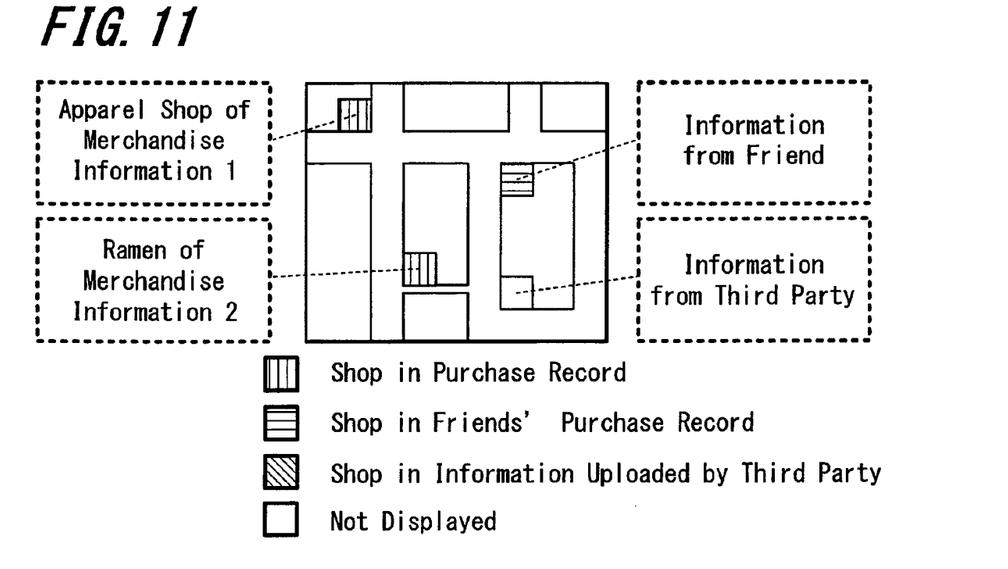
FIG. 11 is an explanatory diagram showing an example of map display according to an embodiment of the present invention.

FIG. 11 shows the example in which the server is accessed by the mobile phone unit and the information uploaded by the user and the information uploaded by friends are displayed. In this case, the position of the shop registered by a friend in the group is displayed in the map in addition to the position of the shop shown in FIG. 10 that is stored by the user. When the shop registered by the friend in the group is selected, the detailed information related to the merchandise, food, or service purchased or dined by the friend in that shop is displayed.

Figure 12:
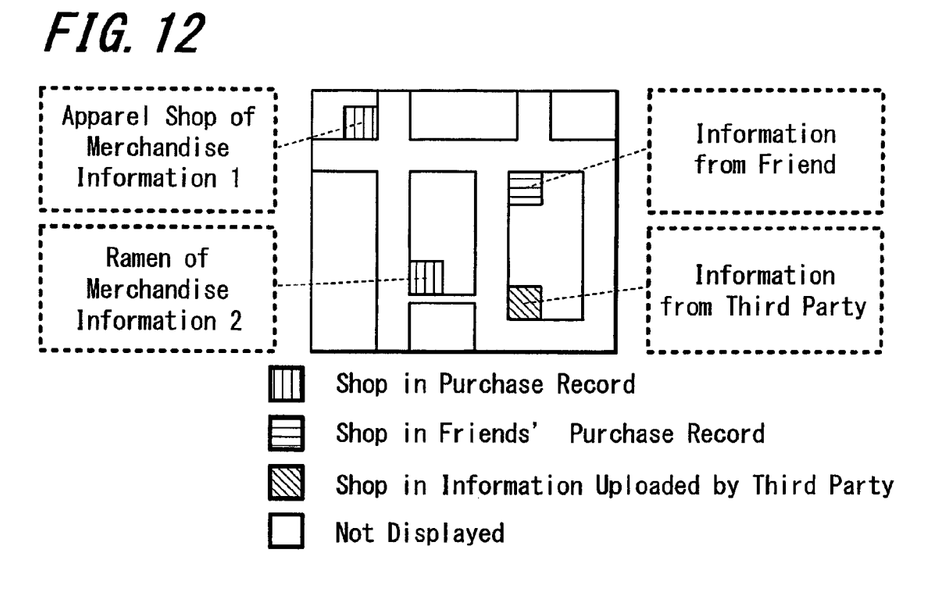
FIG. 12 is an explanatory diagram showing an example of map display according to an embodiment of the present invention.

FIG. 12 shows the example in which the server is accessed by the mobile phone unit and the information uploaded by the user, the information uploaded by the friend, and the information uploaded by a third party are displayed. In this case, the information on the position stored by an unspecified third party is displayed in the map with the position of the shop stored by the user and the position of the shop stored by the friend in the group, which are shown in FIG. 11. When the shop stored by the unspecified third party is selected, the detailed information related to the merchandise, food, or service purchased or dined by the third party in that shop is displayed. It should be noted that the examples shown in FIGS. 11 and 12 are displayed such that the shop stored by the user, the shop stored by the other member in the group, and the shop stored by the third party are respectively displayed in different display modes. It is convenient for the user to separately display the shops, since it can be easily understood when selecting the shop whether the selected shop is the shop where the user purchased goods or the like in the past.

Figure 13:
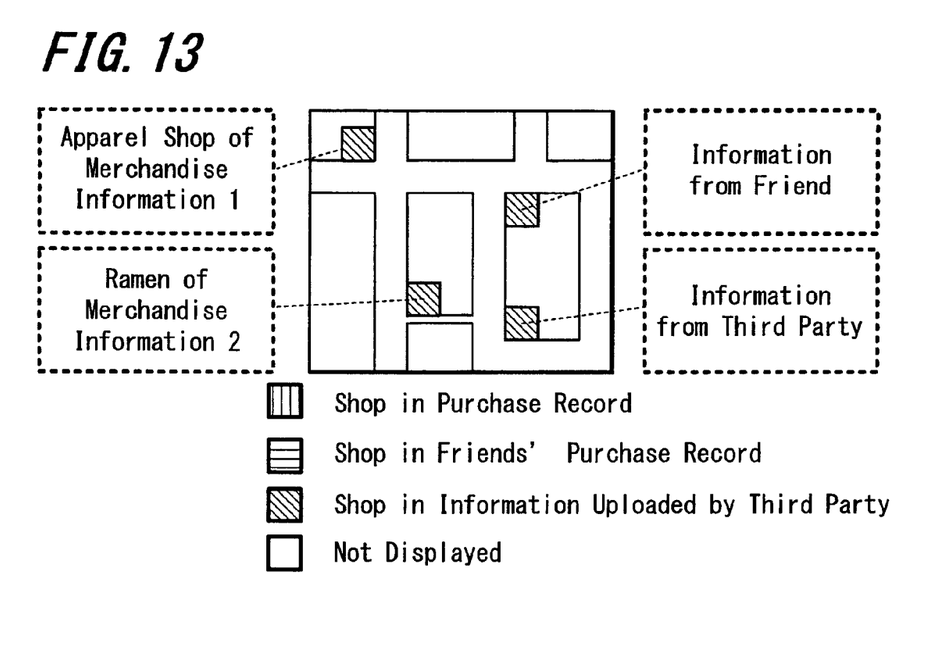
FIG. 13 is an explanatory diagram showing an example of map display according to an embodiment of the present invention.

FIG. 13 shows the example in which the map is displayed based on the information obtained by sending the server the request for obtaining the information without carrying out the personal authentication. In this example, all the purchase records of shops displayed are disclosed to a third party, and respective shops with the payment settlement records are shown in the map in a state of the names of users undisclosed. The displayed position of each shop is selected in the state, so that the information such as the merchandise purchased in that shop is displayed within the allowed disclosure range.

According to the communication system of this embodiment, the information on the merchandise and the like for which the payment is settled can be stored in the mobile phone unit and the same information can be stored in the predetermined server, in the case where the payment settlement for the merchandise and the like is made by the payment settlement function using the noncontact IC card unit 27 provided in the mobile phone unit. As a result, it becomes possible to provide the information on the merchandise purchased in the past and the like using such stored information.

In the embodiment described above, the payment settlement is made through the wireless communication performed with the reader/writer using the noncontact IC card unit as the payment settlement for the purchased goods. However, the embodiment of the invention is applicable to such a case where the payment settlement for the purchased goods is made by another payment settlement method using a communication terminal. For example, a processing unit to access the Internet using wireless LAN and wireless telephone line may be built in the communication terminal. Then, the website of the shop and the like are accessed via the Internet connected by the processing unit, so that the payment settlement processing is carried out on the terminal using the accessed site. Accordingly, the information on the merchandise, shop, and the like for which the payment settlement processing is carried out can be stored.

Also, the map information is transferred from the outside to the terminal in the above-described example but the map data may be prepared beforehand and kept in the terminal. In addition, when purchased items (such as merchandise, food, and service), shops and the like are displayed, other display modes may be adopted such that the purchased items and shops are displayed as a list instead of displaying in relation to the map display shown in FIG. 10, for example. Further, in the case where the merchandise and shop is identified from the payment settlement processing, the identified merchandise and shop may be recorded (stored) after adding a result of the retrieval obtained from the Internet.

Furthermore, the communication terminal having the payment settlement function is used as the terminal for displaying the data obtained from the server in the above-described example, however, a communication terminal not having the payment settlement function is also applicable in the case of only performing display. Moreover, a terminal configured as a personal computer other than the mobile phone unit is also applicable as the display terminal as long as the terminal is capable of accessing the server.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system comprising:
a communication terminal configured to wirelessly communicate with a base station and including
a position information acquisition unit configured to obtain position information of the communication terminal at present,
a payment settlement processing unit configured to perform payment settlement processing for a purchase by transmitting a purchase request from the communication terminal to a management server, and receiving authorization of a deposited amount of funds corresponding to the purchase request from the management server,
a record memory unit configured to store the position information, when performing the payment settlement processing, and a record of a completed purchase for which the payment settlement processing was performed at the payment settlement processing unit,
a display unit configured to display a map based on the position information stored in the record memory unit when performing the payment settlement processing and the record of the completed purchase stored in the record memory unit, and
a control unit configured to transfer the record of the completed purchase stored in the record memory unit to the server; and
a data server configured to transfer data through the wireless communication with the communication terminal, including
a storage unit configured to store the record of the completed purchase transferred from the communication terminal; and
a record disclosure processing unit configured to transfer the record of the completed purchase stored in the storage unit to other communication terminals within a predetermined range.

2. A communication system according to claim 1, wherein the payment settlement processing unit is a short-range wireless communication processing unit configured to perform wireless communication with a reader/writer in proximity to the communication terminal.

3. A communication system according to claim 1, wherein information based on a record of completed purchases carried out by other communication terminals transferred from the data server is displayed when the display unit displays the map.

4. A communication system according to claim 1, wherein the range of transfer of the record of the completed purchase stored in the record disclosure processing unit of the data server is limited within a group of communication terminals registered in advance.

5. A communication system according to claim 1, wherein the communication terminal further includes a data processing unit configured to add data to the record of the completed purchase, the data indicating a merchandise or a service for which the payment settlement processing was performed.

6. A communication system according to claim 1, wherein the storage unit of the server stores, as part of the record of the completed purchase, the transfer range of which is predetermined.

7. A communication system according to claim 1, wherein the payment settlement processing unit is configured to perform payment settlement processing for a purchase by transmitting the purchase request from the communication terminal to the management server via a point-of-sale terminal, and receive authorization of the deposited amount of funds corresponding to the purchase request from the management server via the point-of-sale terminal.

8. A communication terminal for performing wireless communication with a base station, comprising:
a position information acquisition unit configured to obtain position information of the communication terminal at present;
a payment settlement processing unit configured to perform payment settlement processing for a purchase by transmitting a purchase request from the communication terminal to a management server, and receiving authorization of a deposited amount of funds corresponding to the purchase request from the management server;
a record memory unit configured to store the position information, when performing the payment settlement processing, and a record of a completed purchase for which the payment settlement processing was performed at the payment settlement processing unit together with information indicating a disclosure range of the record of the completed purchase;
a data processing unit configured to store the record of the completed purchase that is stored in the record memory unit and a record of a completed purchase that is transferred from a predetermined server related to a completed purchase carried out by other communication terminals in the record memory unit;
a display unit configured to display a map based on the position information stored in the memory unit when performing the payment settlement processing and the record data of the completed purchase stored in the record memory unit; and
a control unit configured to transfer the record of the completed purchase stored in the record memory unit to the predetermined server.

9. A communication terminal according to claim 8, wherein
the information indicating the disclosure range includes identification information corresponding to other communication terminals that are permitted to access the record data transferred to the server from the communication terminal.

10. A communication terminal according to claim 8, wherein
the payment settlement processing unit is configured to perform payment settlement processing for a purchase by transmitting the purchase request from the communication terminal to the management server via a point-of-sale terminal, and receive authorization of the deposited amount of funds corresponding to the purchase request from the management server via the point-of-sale terminal.

11. A communication method between a communication terminal performing wireless communication with a predetermined base station and a server capable of transferring data through the wireless communication with the communication terminal, comprising:
obtaining, by a position information acquisition unit at the communication terminal, position information of the communication terminal at present,
storing record data of a completed purchase for which payment settlement processing was performed in the case where the payment settlement processing is performed by a payment settlement processing function provided in the communication terminal by transmitting a purchase request from the communication terminal to a management server, and receiving authorization of a deposited amount of funds corresponding to the purchase request from the management server, storing the position information, when performing payment settlement processing, and the stored record of the completed purchase, displaying, by a display of the communication terminal, a map based on the stored position information when performing the payment settlement processing and the stored record of the completed purchase, transferring the stored record of the completed purchase to the server, and storing the record of the completed purchase transferred to the server and transferring the stored record of the completed purchase to other communication terminals within a predetermined range.

12. A communication system according to claim 1, wherein
the predetermined range includes identification information corresponding to other communication terminals that are permitted to access the record data transferred from the communication terminal to the server.

13. A communication method according to claim 11, wherein
the predetermined range includes identification information corresponding to other communication terminals that are permitted to access the record data transferred from the communication terminal to the server.

14. The communication method according to claim 11, wherein
the payment settlement processing function at the communication terminal performs payment settlement processing for a purchase by transmitting the purchase request from the communication terminal to the management server via a point-of-sale terminal, and receives authorization of the deposited amount of funds corresponding to the purchase request from the management server via the point-of-sale terminal.

* * * * *